United States Patent [11] 3,604,815

| [72] | Inventor | Anton Hubert Clemens<br>Elkhart, Ind. |
|---|---|---|
| [21] | Appl. No. | 723,102 |
| [22] | Filed | Apr. 22, 1968 |
| [45] | Patented | Sept. 14, 1971 |
| [73] | Assignee | Miles Laboratories, Inc.<br>Elkhart, Ind. |

[54] REFLECTANCE METER
4 Claims, 4 Drawing Figs.

[52] U.S. Cl. .................................................. 356/191,
250/210, 356/195, 356/212, 356/226
[51] Int. Cl. ....................................................... G01j 3/52,
G01j 3/46, G01n 21/48
[50] Field of Search............................................ 356/22,
212, 226, 177, 176, 179, 186, 195; 250/210

[56] References Cited
UNITED STATES PATENTS

| 2,739,246 | 3/1956 | Hunter .......................... | 356/212 |
|---|---|---|---|
| 2,774,276 | 12/1956 | Glasser et al. ................ | 356/176 |
| 3,039,353 | 6/1962 | Coates et al. .................. | 356/51 X |
| 3,062,092 | 11/1962 | Schmidt ........................ | 356/226 UX |
| 3,147,680 | 9/1964 | Stimson ......................... | 356/226 X |
| 3,340,764 | 9/1967 | Bergson ........................ | 356/177 |
| 3,445,170 | 5/1969 | Dietrich et al. ................ | 356/226 |
| 3,215,843 | 11/1965 | Neil ................................ | 250/205 |

FOREIGN PATENTS

| 755,725 | 8/1956 | Great Britain................ | 356/212 |

*Primary Examiner*—Ronald L. Wibert
*Assistant Examiner*—Warren A. Sklar
*Attorneys*—Joseph C. Schwalbach, Michael A. Kondzella and Louis E. Davidson

ABSTRACT: A small, portable photoelectric cell-type reflectance meter is described for use in measuring color reflectance values of analytical test devices. Since these analytical test devices have predetermined ranges of color reflectance values, the reflectance meter is preset to read color values within these ranges. The meter has a constant light output circuit, a regulated power supply based on battery power and a battery power check circuit.

PATENTED SEP 14 1971

INVENTOR
ANTON HUBERT CLEMENS
BY Louis E. Davidson
ATTORNEY

PATENTED SEP 14 1971

INVENTOR
ANTON HUBERT CLEMENS
BY Louis E. Davidson
ATTORNEY

INVENTOR
ANTON HUBERT CLEMENS
BY Louis E. Davidson
ATTORNEY

REFLECTANCE METER

BACKGROUND OF PRIOR ART

It is well-known in the art that reflectance meters employing photoelectric cells can be used to determine color values by measuring the amount of light reflected from a colored surface illuminated by a reference light source. These prior art reflectance meters have several disadvantages when it is sought to use them to quickly measure color values of analytical test devices, such as bibulous carriers impregnated with chemical reagent systems. The first such disadvantage is that the prior art reflectance meters required standardization adjustments just prior to the use thereof. Such standardization adjustments are necessary to compensate for variations in power to the light source and to compare the measured values to the light reflected from a reference color surface similar in color to the sample color being ultimately measured.

Since the power adjustments of prior art instruments generally corrected only the voltage and/or current to provide a substantially constant power input to the light source, there was a possible error in the instrument calibration as the light output from the light source deteriorated with age even under controlled constant power input.

Whenever the instrument was used to measure color values in a particular color range and then was to be used to measure color values in a substantially different color range, the instrument needed to be recalibrated for the new color range. This is not only an inconvenience, but it can introduce measurement errors if these recalibrations are not accurately performed. The prior art instruments for this reason generally required highly skilled personnel to operate them correctly.

The prior art instruments also had the disadvantages of not being battery operated and of being generally large in size an of substantial weight.

It is highly desirable that a reflectance meter for use in measuring analytical test devices be relatively small and lightweight for easy portability, be battery-operated, and have precalibrated circuits so that relatively unskilled personnel can obtain accurate results through its use.

SUMMARY OF THE INVENTION

This invention relates to a small, portable, preferably battery-operated, photoelectric cell-type reflectance meter useful for measuring color values of analytical test devices, such as bibulous carriers impregnated with chemical reagent systems. In accordance with the invention, an instrument is provided for measuring light reflected from a colored surface having a predetermined range of color reflectance values, said instrument comprising a light source, a reference circuit including means providing a reference reflectance surface and at least one reference photoelectric cell exposed to light from said source reflected from said reference surface and which is connected to adjustably control the current flow to and thereby the light emitted from said light source in a manner to maintain the intensity of said light emission at a substantially constant value, means for supporting a member having a colored surface the reflectance of which is to be measured in a predetermined position wherein said surface is exposed to light emitted from said source, a measuring circuit which includes at least one measuring photoelectric cell exposed to the light reflected from aid colored surface, an indicating meter, and a power source to provide electrical power for said light source, and said reference and measuring circuits.

DESCRIPTION OF THE INVENTION

Figure 1:
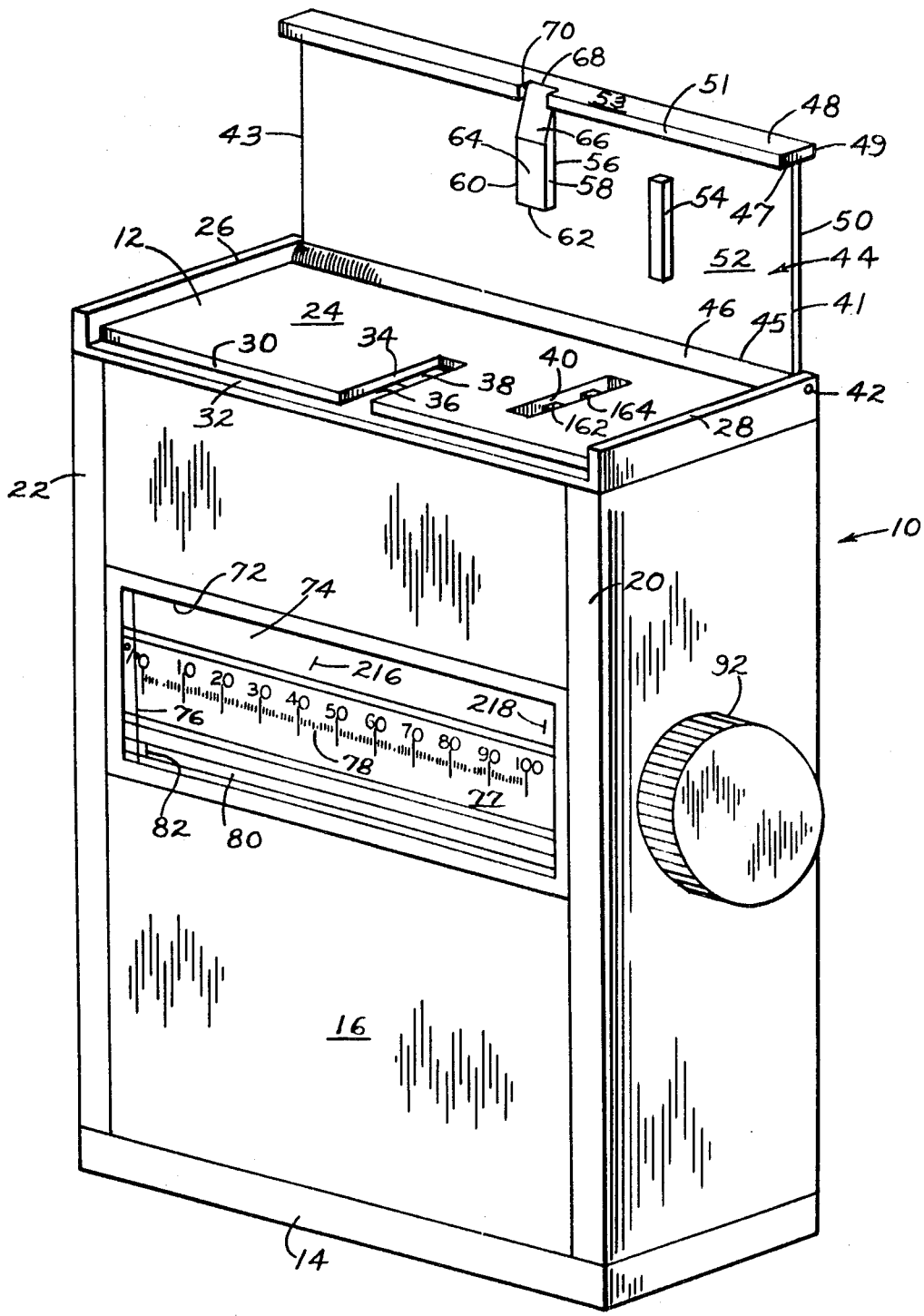
FIG. 1 is an isometric perspective view of apparatus of the present invention.

Referring to FIG. 1, the illustrated embodiment of the reflectance meter is incorporated within a case 10 of generally rectangular shape with a horizontal top wall 12, a removable horizontal bottom plate 14, a removable vertical front cover panel 16, a vertical backwall (not shown) parallel to front panel 16, and parallel vertical sidewalls 20 and 22. Top wall 12 has a generally flat upper surface 24 and parallel top edge extensions 26 and 28 which are normal to and extend above surface 24 and are flush with the outer surfaces of the sidewalls 20 and 22. The front edge of top wall 12 is cut back to form a horizontal front ledge surface 32 and a vertical front ledge surface 30. Top wall 12 also is formed in its upper surface 24 with a rectangular slot 34 which extends rearwardly from front surface 30 to a point about halfway between front cover 16 and the back of case 10. Slot 34 has a depth equal to that of the vertical ledge surface 30 such that its bottom surface 36 is coplanar with horizontal ledge surface 32. At the inner end of the slot 34 the top wall 12 is formed with a rectangularly shaped opening 38. Top wall 12 is further formed with an elongated rectangular opening 40 which is generally parallel with the slot 34 and is located about halfway between slot 34 and top edge extension 28.

A pivot pin 42 extends horizontally through and between top edge extensions 26 and 28 and is located near the junction of the top wall 12 and the back of case 10. A rectangular lid 44 has parallel longitudinal rear and front edge portions 45 and 47 and parallel transverse edges 41 and 43 and has a hinge portion 46 extending along edge portion 45 through which pivot pin 42 passes. Lid 44 also has an upper surface 50 and a lower surface 52 and is provided with an elongated rectangular ridge handle portion 48 extending along the front edge portion 47 and normal to the lid 44.

Ridge handle portion 48 has parallel upper and lower surfaces 49 and 51 and a front surface 53. Ridge handle portion 48 is formed with a rectangular slot 70 which extends upwardly from lower surface 51 to the plane of the lower surface 52 of lid 44. Slot 70 is aligned with the slot 34 in top wall 12.

Lid 44 further has a bar member 56 attached to the lower surface 52 thereof which is also aligned with the slot 34 in top wall 12. Bar member 56 has parallel sides 58 and 60 and a rear end surface 62, all of which are normal to the lid lower surface 52. The bar member 56 has a flat lower surface 64 parallel to lid lower surface 52 and has an inclined front surface 66 which extends from surface 64 to a knife edge 68 in the plane of surface 52. The front end portion of bar member 56 fits snugly into the slot 70 of ridge handle 48 with the edge 68 thereof flush with the outer surface 53. Lid 44 still further has a transverse bar member 54 which is attached to the lower surface 52 and is aligned with the rectangular opening 40 in top wall 12.

When lid 44 is hingeably moved about pivot pin 42 to a closed position (not shown) wherein the lower surface 52 of lid 44 comes into contact with surface 24 of top wall 12, bar member 56 is positioned within slot 34 of top wall 12 with the flat surface 64 located directly above opening 38. In this situation, bar member 54 extends into opening 40 of the top wall 12 and the lower surface 51 of the ridge handle 48 is in contact with the horizontal front ledge surface 32 of said top wall 12.

Front cover 16 has a rectangular opening 72 therein which is covered by transparent glass 74. Visible through the glass 74 is the indicating needle 76 of an indicating meter 75 to be described later and a flat surface 77 on which is printed the linear indicating scale 78 for said indicating meter. A ribbon mirror 80 is provided adjacent to the indicating scale so the parallax errors in reading the meter can be avoided by viewing the meter in such a manner that the mirror reflection 82 of the needle 76 is hidden behind the needle itself.

Figure 2:
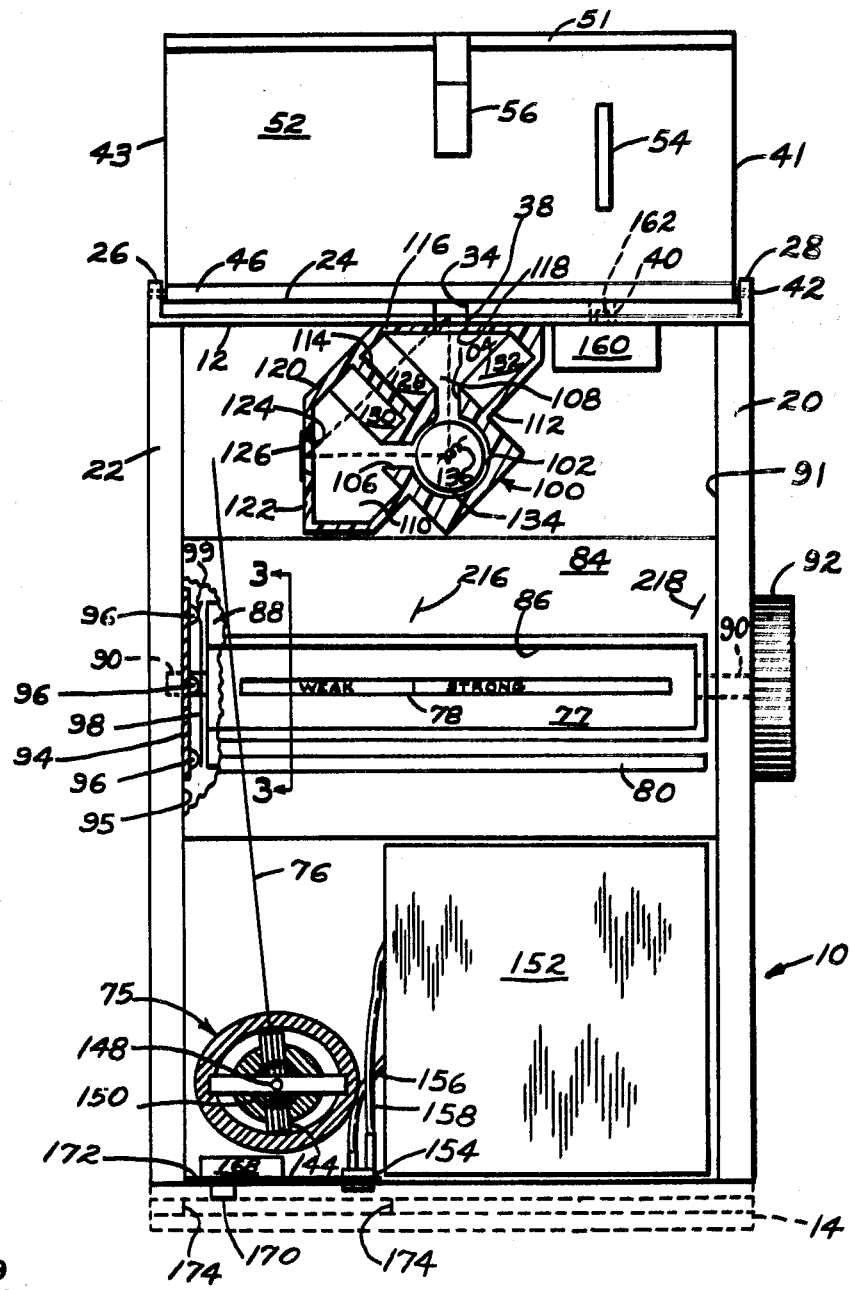
FIG. 2 is a front elevation of the apparatus of FIG. 1 with the front cover and bottom plate removed.
Figure 3:
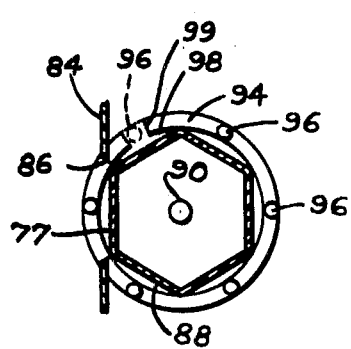
FIG. 3 is a partial cross-sectional view of FIG. 2 taken along Line 3—3 of FIG. 2.

Referring to FIG. 2, the apparatus case 10 is shown with the front cover 16 and bottom plate 14 removed. A flat plate 84 having an elongated rectangular bevel-edged opening 86 therein is mounted transversely between sidewalls 20 and 22 and parallel to the below removable front cover 16. Surface 77 of the indicating meter is positioned so as to be visible through opening 86. As shown in FIG. 3, surface 77 is one of six outer surfaces of a member 88 having a generally hexagonal cross section. Member 88 is mounted on a shaft 90 which is supported appropriately in sidewalls 20 and 22 and extends through sidewall 20. A knurled knob 92 located externally of sidewall 20 is keyed to the shaft 90. As knob 92 is turned and rotates shaft 90, successive outer surfaces 77 of member 88 are exposed through the opening 86.

As shown in the partial cutaway view in FIG. 2, an insulating ring 94 is mounted on the inner surface 95 of sidewall 22 in concentric relation to shaft 90. Six electrical contacts 96 are spaced equidistant around ring 94, as shown in FIG. 3, and extend inwardly from ring 94 in a direction parallel to the longitudinal axis of shaft 90. An electrical contactor ring 98 having a radial contact arm 99 is mounted on and electrically insulated from the shaft 90. Contractor ring 98 is parallel to and spaced slightly from ring 94 so that the only part of contractor ring 98 that actually touches contacts 96 is the contact arm 99. As shaft 90 rotates along with knob 92 and member 88, contactor arm 99 successively makes separate electrical connection with the individual contacts 96.

A similar combination (not shown) of insulating ring, contacts, contactor ring and contact arm is mounted at the other end of the member 88 near the inner surface 91 of sidewall 20 and concentric with shaft 90 to provide a second set of rotatable selectable electrical contacts. Alternatively both sets of rotatable selectable contacts can be mounted at the same end of shaft 90 or they can be mounted remote from shaft 90 but connected thereto through a suitable gear train (not shown).

A housing member 100 is located below top wall 12 and above the flat plate 84. As shown in FIG. 2, housing member 100 has its cover removed so that its inner construction is visible. In use housing member 100 is covered so that undesirable external light does not enter its chambers. Housing member 100 is made of a suitable opaque material such as an organoplastic and contains three chambers 102, 108 and 110. Chamber 102 is cylindrical and its axis is parallel to the plane of top wall 12 and normal to the planes of front cover panel 16 and the back of apparatus 10. Chamber 102 has two passages 104 and 106 communicating radially therewith. Passage 104 extends vertically toward the top wall 12 and in alignment with opening 38 therein, while passage 106 is normal to passage 104 and extends horizontally toward and normal to the sidewall 22. Passage 104 communicates between chamber 102 and chamber 108. Passage 106 communicates between chamber 102 and chamber 110.

As viewed in FIG. 2, chamber 108 has a generally triangular cross section formed from walls 112, 114 and 116. Wall 116 underlies the top wall 12, and walls 112 and 114 are normal to each other and disposed in planes at 45° angles with respect to the top wall 12. Wall 116 has an opening 118 therein which is aligned with the opening 38 in top wall 12 as well as with the passage 104.

Chamber 110 is formed by walls 114 and 120. Wall 120 has a flat portion 122 which is parallel to sidewall 22 and normal to top wall 12. Wall portion 122 is formed with an opening 124 therein which is coaxial with the passage 106. A reference reflectance surface 126 is positioned on the outer surface of wall portions 122 covering the opening 124 therein.

A measuring photoelectric cell 128 is mounted in chamber 108 with its back abutting the wall 114 and its front facing the opening 118. Reference photoelectric cell 130 is mounted in chamber 110 with its back abutting the wall 114 and its front facing opening 124. Preferably a second measuring photoelectric cell 132 is mounted in chamber 108 with its back abutting the wall 112 and its front facing the opening 118.

A light source, such as bulb 134 having a filament 136, is positioned in the chamber 102 with the filament 136 exposed equally to passages 104 and 106.

When the instrument is used to measure the reflectance of a color surface sample (not shown) positioned in the slot 34 over the opening 38, the physical relationship between the light source, the color surface whose reflectance is to be measured, a measuring photoelectric cell, a reference photoelectric cell and the reference reflectance surface being such that the paths of light emitted from said source form an isosceles right triangle, shown in dotted lines in FIG. 2. The light source is located at the intersection of the triangle legs, the color surface to be measured is located at the intersection of one leg and the hypotenuse of the triangle, the reference reflectance surface is located at the intersection of the other leg and the hypotenuse, and the measuring photoelectric cell and the reference photoelectric cell are mounted back-to-back midway along the hypotenuse. This apparatus arrangement is such that the distance from the light source to the reference surface to the reference cell is the same as the distance from the light source to the sample surface to the measuring cell. Passages 104 and 106 are also arranged so as to form shielding surfaces which prevent light from the filament 136 from shining directly on the measuring cells 128 and 132 and on the reference cell 130.

The indicating meter 75 mounted in the lower portion of the case 10 and may take the form of a galvanometer having a moving coil 144 affixed to a rotary shaft 148 to which the indicating needle 76 is also affixed. When an electrical current is caused to flow through meter coil 144, said coil, shaft 148 and the needle 76 are caused to rotate through an angle the magnitude of which is dependent on the amount of current flowing through the coil. The resulting movement of needle 76 can be read on the scale 78 located on surface 77 of member 88 in terms of values directly related to the current flow through the coil 144. When there is no current flowing through coil 144, a spiral spring 150 maintains the needle in a desired "no current" position as shown in FIG. 2.

It is generally desirable, both for convenience and accuracy in reading, to have a linear scale for an indicating meter. However, it has been found that, for the most part, the analytical test devices that are to be used with the apparatus of the present invention have nonlinear color reflectance characteristics. In order to provide a linear "read-out" on the present apparatus, the pivot axis for indicating needle 76 is placed off-center with respect to said scale as shown in FIG. 2. It will be observed that when the needle 76 is in the "no current" position shown in FIG. 2, it is disposed generally normal to said scale. This arrangement provides a nonlinear relationship between the location of the needle 76 along the scale 78 and the degree of rotation of the needle 76. This nonlinear relationship generally matches and corrects for the nonlinear color reflectance characteristics of the color surfaces being measured so that accurate readings can be obtained along a linear scale of the type shown in FIG. 1.

Attached to top wall 12 beneath opening 40 is a switch box 160 containing two single pole double throw switches 160a and 160b (see FIG. 4) which have movable contact-actuating contactor buttons 162 and 164 respectively. Buttons 162 and 164 normally extend up into opening 40. However, when lid 44 is moved to its closed position, said buttons are depressed by the bar extension 54. The resulting effect on the electrical circuit of the apparatus will be explained later.

A double pole single throw switch 168 having a movable "ON-OFF" switch button 170 is mounted on a plate 172 which is, in turn, suitably attached to the lower portion of sidewall 22 within the case 10. A jack 154 is also mounted through plate 172 adjacent the switch 168. Switch button 170 and jack 154 are accessible through an opening 174 in the removable bottom plate 14 which is shown in phantom in FIG. 2.

Figure 4:
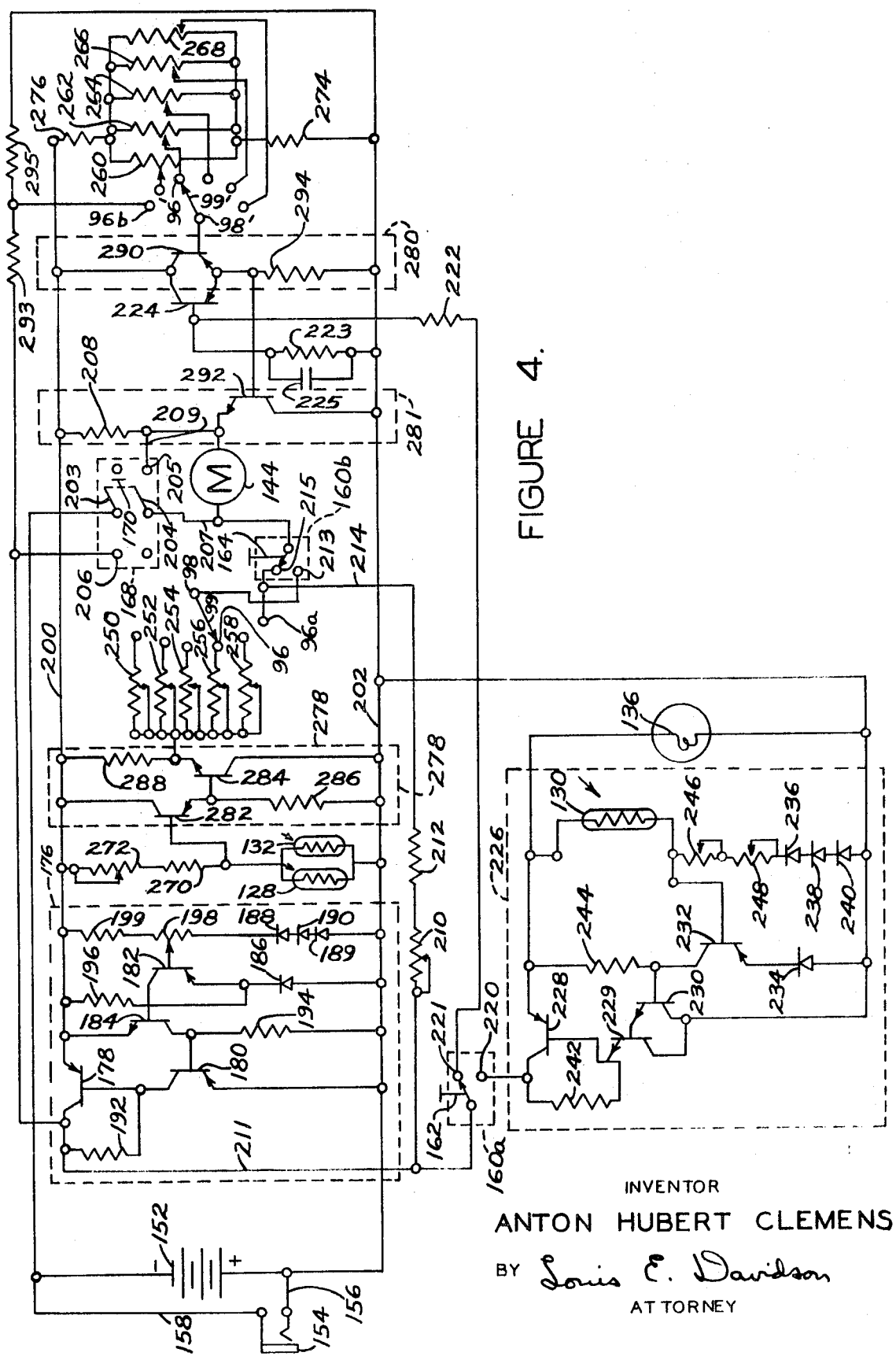
FIG. 4 is a schematic diagram of the electrical circuits of the apparatus of the present invention.

Switch 168, shown in FIG. 4, has a pair of movable contacts 203 and 204, a contact 206 with which the contact 203 cooperates, and a contact 205 with which the contact 204 cooperates. Switch contact 204 is connected to line 207 and contact 205 is connected to line 209. Thus, when switch 168 is in the "OFF" or right-hand position as shown in FIG. 4, contact 204 engages contact 205 and forms an electrical short circuit across the meter coil 144. This acts to dampen any movement of the meter coil 144 and associated meter needle 76 if the apparatus is physically moved. This prevents damage to the meter coil mechanism. When switch 168 is in the "ON" or left-hand position as viewed in FIG. 4, contact 204 is disengaged from the contact 205 and the meter coil-damping action is thereby removed.

Power for the light source 136 and for the electrical circuits to be described later which supply electrical current to meter coil 144 is obtained from a battery 152 located within the lower portion of case 10 adjacent to the indicating meter movement 75 as shown in FIG. 2. A rechargeable type battery is preferably employed in this apparatus. Inlet jack 154 is connected across the terminals of the battery 152 by wires 156 and 158. A charging unit (not shown) can be connected to the battery through jack 154 whenever it is necessary to recharge the rechargeable battery 152.

The operation of the apparatus will be explained in further detail with respect to FIG. 4 which is a schematic diagram of the electrical circuitry. The apparatus is powered by the battery 152 which is connected to the remainder of the circuit through the contacts 203 and 206 of the "ON-OFF" switch 168, and said contacts are disengaged in the "OFF" position of said switch. When switch button 170 is moved to the "ON" position to engage contact 203 with contact 206, the battery potential is applied across the regulated power supply shown within the dashed line 176.

This regulated power supply 176 comprises transistors 178, 180, 182 and 184, rectifiers 186, 188, 189 and 190 and resistances 192, 194, 196, 198 and 199 connected as shown. When the battery 152 employed has a voltage of 3 to 3.9 volts, for example, this regulated power supply will maintain a substantially constant potential of −2.4 volts along line 200 with respect to the potential along line 202 irrespective of fluctuations in battery output voltage within the above voltage range.

The output potential of the regulated power supply 176 is connected through line 200 and through resistance 208 to one terminal of the meter coil 144. The actual battery potential is connected to the other terminal of meter coil 144 through line 211, resistances 210 and 212, line 214, contact 215 and switch contactor 164 of switch 160b.

When lid 44 is in the open position shown in FIGS. 1 and 2, switch contactors 162 and 164 are in the positions shown in FIG. 4. The battery and power supply potentials are thus applied across the meter coil 144. If the actual battery potential is 3 volts, meter coil 144 will move the needle 76 to a position shown by the weak battery mark 216 on the face of plate 84 above scale 78 shown in FIGS. 1 and 2. If the actual battery potential is less than 3 volts, the indicating needle 76 will be moved to a position to the left of the mark 216. This indicates that the battery should be replaced or recharged through the recharging jack 154. If the actual battery potential is 3.9 volts, the indicating needle 76 will be moved to the position shown by the strong battery mark 218 on the face of plate 84. If the actual battery potential is greater than 3.9 volts, the needle 76 will tend to be moved to a position to the right of mark 218. The apparatus can be used whenever the needle 76 assumes a position between marks 216 and 218 upon movement of the lid 44 to its open "No-load Battery Check" position.

When lid 44 is in the open position, the battery potential is applied through line 211, contactor 162 and contact 221 of switch 160a, resistor 222 and resistor 223. The potential developed across resistor 223 is applied to transistor 224. The operation of transistor 224, in turn, develops sufficient potential across resistor 294 which, when applied to transistor 292, blocks transistor 292 and thus electrically isolates the meter coil 144 from the circuit to the right of meter coil 144, as viewed in FIG. 4, during the "No-load Battery Check."

To activate the measuring circuits of this apparatus, lid 44 is moved to the closed position wherein bar extension 54 depresses switch contactors 162 and 164 to interrupt the circuits through contacts 221 and 215 and complete the circuits through contacts 220 and 213, respectively, shown in FIG. 4. In the event that contactors 162 and 164 do not move from one position to the other at exactly the same time, a damaging potential might be applied across meter coil 144. Capacitor 225 connected across resistor 223 prevents this by slowing down the unblocking of transistor 292 when the movable contactor 162 of switch 160a moves out of engagement with contact 221 into engagement with contact 220.

When switch 160a is thus activated through contact 220, it applies the battery potential to filament 136 of the light source through the constant light output control circuit enclosed within the dashed line 226 in FIG. 4. This results in emission of light from filament 136. The control circuit 226 comprises the reference photoelectric cell 130, transistors 228, 229, 230 and 232, rectifiers 234, 236, 238 and 240, and resistances 242, 244, 246 and 248 connected as shown. Reference cell 130 is preferably of the cadmium sulfide type which is known to have excellent sensitivity and long term stability.

The light from the filament 136 is directed against the reference surface 126 (shown in FIG. 2) and reflected toward reference cell 130. If the light received by the cell 130 varies from a predetermined value based on the specific reference surface, the control circuit 226 adjusts the current flow to the filament 136 to bring the light emitted from filament 136 and received by cell 130 back to the predetermined value. The control circuit 226 thus compensates for battery power fluctuations and deterioration of the light source to maintain substantially constant light emission intensity during use of the instrument.

The measuring circuit portion of the apparatus of the present invention includes the measuring photoelectric cells 128 and 132, preferably of the cadmium sulfide type, which are connected in parallel, meter coil 144 of the indicating meter 75, a selectable plurality of variable resistances 250, 252, 254, 256 and 258, a selectable plurality of variable resistances 260, 262, 264, 266 and 268, and resistances 270, 272, 274 and 276. This measuring circuit is in the form of a Wheatstone bridge with the cells 128 and 132 forming one arm of the circuit, resistances 270 and 272 forming a second arm of the circuit, selectable variable resistance 260, 262, 264, 266 or 268 in combination with fixed resistances 274 and 276 forming the other two arms of the circuit. Selectable variable resistance 250, 252, 254, 256 or 258 is connected in series with the meter coil 144 which forms the meter portion of the Wheatstone bridge. Power from the regulated power supply circuit 176 is supplied to the measuring circuit through lines 200 and 202.

The specific settings for the variable resistance selected from resistances 250-258 inclusive and for the variable resistance selected from resistances 260-268 inclusive are predetermined by the particular desired range of color reflectance values to be measured by the instrument. The measuring circuit thus contains a set of plural variable resistances, such as 256 and 262, which are adjustable so as to provide reflectance measurement readings within a desired range. These resistances are adjustably calibrated by the instrument manufacturer and need not be adjusted by the operator of the instrument.

The schematic diagram shown in FIG. 4 has five sets of variable resistances, each set containing a plurality of resistances which are adjustable to predetermined values corresponding to a predetermined range of color reflectance values of a colored surface whose reflectance is to be measured. This instrument in its exemplified form can thus have five predetermined color reflectance ranges.

The specific resistance from the group of resistances 250-258 inclusive to be used in the circuit is selected by means of switch contactor arm 99 which is moved into electrical connection with the appropriate contact terminal of the desired resistance as exemplified by contact terminal 96 by rotation of knurled knob 92. The specific resistance from the group of resistances 260-268 inclusive to be used in the circuit is selected by means of switch contactor arm 99' which is also moved into electrical connection with he appropriate contact 96' of the desired resistance by rotation of knurled knob 92. The sixth position in which the contactor arms 99 and 99' are not connected to any variable resistance will be explained later.

In order to improve the measurement sensitivity of this instrument, the measuring circuit preferably includes current amplifier circuits shown within the dashed lines 278, 280 and 281. Dashed line 278 is one amplifier circuit while dashed lines 280 and 281 in combination form the other amplifier circuit. These amplifier circuits are connected to the respective terminals of indicating meter coil 144. Amplifier circuit 278 comprises transistors 282 and 284 and resistances 286 and 288 connected as shown. Amplifier circuit 280–281 comprises transistors 290 and 292 and resistances 294 and 208 connected as shown.

When the instrument is employed to determine the color reflectance from a test sample surface, such as the blood glucose test device of U.S. Pat. No. 3,298,789, the test device, which may take the form of a relatively thin strip, is placed in slot 34 with the test sample surface facing downward over opening 38 as viewed in FIGS. 1 and 2. Knurled knob 92 is then turned to expose the desired scale 78 through opening 72 in the front cover panel 16. Scale 78 can be calibrated to read directly in analytical units corresponding to the test results obtainable with the test device. The test device of U.S. Pat. No. 3,298,789, for example, produces various color values corresponding to different levels of glucose in blood. Scale 78 can, for example, be calibrated in units of milligrams of glucose per 100 milliliters of blood. Alternatively, as shown in FIG. 1 scale 78 can be calibrated in units of scale percentage from 0 to 100. The scale percentage reading in this case is compared with a calibration chart (not shown) to determine the mg. glucose per 100 ml. blood, for example. When knob 92 id set in a selected position, the appropriate preadjusted resistances of the measuring circuit are also thereby selected so that the apparatus need not be recalibrated and standardized prior to every measurement.

Lid 44 is then closed to bring the surface 64 of extension 56 into contact with the test device strip and at the same time to activate contactors 162 and 164 of switches 160a and 160b for energization of the light source and the measuring circuit. The current flowing through meter coil 144 is related to the color reflectance of the test sample so that a reflectance value, or corresponding test result value, can be read directly on the scale 78.

If the actual color value of the test sample is beyond the predetermined range of the scale selected by knob 92, the needle 76 will take a position beyond one end of the scale 78. In this case, knob 92 is turned to bring another predetermined color range for the specific type of test sample into the measuring circuit. Knob 92 is turned until a range is found which enables the needle 76 to take a position within the readable limits of a scale 78 which is appropriate for that specific test sample.

Once the needle 76 has reached a stable position and a reading has been obtained from scale 78, lid 44 is raised to it open position to inactivate the light source and the measuring circuit. Another test sample can then be placed in slot 34, lid 44 closed and knob 92 adjusted to an appropriate position to obtain a reading for the newly inserted test sample.

It can thus be seen that this instrument can be used to quickly and accurately measure color values of a single sample or a series of samples having predetermined ranges of color values without requiring a separate calibration of the instrument prior to each individual measurement. Since it is relatively small and lightweight and operates from a self-contained power supply, it can be easily transported and used by unskilled personnel to measure color values of test devices whenever needed.

In order to be sure that the instrument is operating properly, it is desirable to occasionally test the battery output under load conditions. For this "Load Battery check," knob 92 is turned so as to place the contactor arms 99 and 99' in the previously unused contact positions designated as 96a and 96b respectively. In this position the two-part scale 78 shown in FIG. 2 is visible. No test sample is employed in this operation. Lid 44 is closed to actuate switches 160a and 160b and create a load on the battery 152 by lighting the filament 136. The regulated power supply potential from line 200 and the unregulated battery potential from line 211 are then applied across meter coil 144 in the same manner described above for the "No-Load Battery check." If the needle 76 assumes a position in the range marked "Weak" on scale 78, the battery should be replaced or recharged. If the needle 76 assumes a position in the range marked "Strong," the battery is suitable for use.

In the "Load Battery Check" test, the battery potential is applied across the voltage divider resistances 293 and 295. A potential from this circuit is applied through contact 96b and contact arm 99' to transistor 290 which in turn develops a biasing potential across resistance 294. This biasing potential blocks transistor 292 in the same manner as described above to isolate meter coil 144 from the aforementioned right-hand portion of the overall circuit.

In summary, this invention relates to improved apparatus for measuring reflected light from a colored test surface having a predetermined range of color values wherein the apparatus contains a measuring circuit adjusted to predetermined ranges corresponding to the ranges of the test surface and also containing a controlled constant light source employed in measuring reflectance values.

I claim:

1. An instrument for measuring light reflected from a colored surface having a predetermined range of color reflectance values, said instrument comprising a light source, means for supporting a member having a colored surface the reflectance of which is to be measured in a predetermined position wherein said surface is exposed to light emitted from said source, a measuring circuit in the form of a Wheatstone bridge having four arms and an indicating meter portion, said bridge having variable resistances in three arms and a measuring photoelectric cell only in the fourth arm, said measuring photoelectric cell being exposed to the light reflected from said surface, a reference reflectance surface also exposed to light emitted from said source, a reference circuit including a reference photoelectric cell exposed to light reflected from said reference surface connected to adjustably control the current flow to and thereby the light emitted from said light source in a manner to maintain the intensity of light emission at a substantially constant value, said reference cell being electrically separate from said measuring circuit, and a power source to provide electrical power for said light source and said reference and measuring circuits, said power source also providing a regulated voltage to said measuring circuit.

2. An instrument according to claim 1 employing a battery as a power source and having means for indicating a weak battery.

3. An instrument according to claim 1 wherein the physical relationship between the light source, the color surface whose reflectance is to be measured, the measuring photoelectric cell, the reference photoelectric cell, and the reference reflectance surface being such that the paths of light emitted from said source form an isosceles right triangle, the light source being located at the intersection of the legs of said triangle, the color surface to be measured being located at the intersection of one leg and the hypotenuse of said triangle, the reference reflectance surface being located at the intersection of the other leg and the hypotenuse, and the measuring photoelectric cell and the reference photoelectric cell being mounted back-to-back and being located midway along the hypotenuse with the measuring cell facing the color surface to be measured and the reference cell facing the reference surface, said instrument also having shielding surfaces to prevent light from the light source from shining directly on the measuring cell and the reference cell.

4. An instrument according to claim 1 wherein the indicating meter has a rotary indicating needle movement and a linear indicating scale, the axis of rotary movement of said indicating needle being located offcenter with respect to the linear indicating scale.